US012615181B2

(12) United States Patent　　　　　(10) Patent No.:　US 12,615,181 B2
Lotter　　　　　　　　　　　　　　　(45) **Date of Patent:　\*Apr. 28, 2026**

(54) SYSTEM FOR CONFIGURING WI-FI ACCESS POINTS

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/407,217

(22) Filed: Jan. 8, 2024

(65) Prior Publication Data

US 2024/0235927 A1　　Jul. 11, 2024

Related U.S. Application Data

(63) Continuation of application No. 17/324,028, filed on May 18, 2021, now Pat. No. 11,909,585.

(60) Provisional application No. 63/026,568, filed on May 18, 2020.

(51) Int. Cl.
*H04L 41/0806*　　(2022.01)
*H04L 41/0803*　　(2022.01)
*H04W 84/12*　　(2009.01)
*H04W 88/10*　　(2009.01)

(52) U.S. Cl.
CPC ...... *H04L 41/0806* (2013.01); *H04L 41/0803* (2013.01); *H04W 84/12* (2013.01); *H04W 88/10* (2013.01)

(58) Field of Classification Search
CPC ........... H04L 41/0806; H04L 41/0803; H04W 84/12; H04W 88/10
See application file for complete search history.

(56) References Cited

U.S. PATENT DOCUMENTS

| | | | |
|---|---|---|---|
| 9,516,558 B2 | 12/2016 | Chou | |
| 10,231,134 B1 | 3/2019 | Brisebois et al. | |
| 10,608,729 B1 | 3/2020 | Youtz et al. | |
| 11,909,585 B2 \* | 2/2024 | Lotter ................. | H04L 41/0803 |
| 2008/0039132 A1 | 2/2008 | Delibie et al. | |
| 2008/0057956 A1 \* | 3/2008 | Black ................... | H04W 48/10 |
| | | | 455/435.1 |

(Continued)

OTHER PUBLICATIONS

International Searching Authority of the PCT; ISA/US; "Notification of Transmittal of the International Search Report and the Written Opinion of the International Searching Authority, or the Declaration"; dated Aug. 26, 2021; PCT Application No. PCT/US2133036 filed May 18, 2021; pp. 1-8 (2021).

(Continued)

*Primary Examiner* — Kenny S Lin
(74) *Attorney, Agent, or Firm* — FisherBroyles, LLP; James Cleary

(57) ABSTRACT

A system for configuring a Wi-Fi access point for communication with the Internet includes a Wi-Fi access point configuration system connected with one or more cellular networks and being configured to receive information from at least one of the one or more cellular networks. The Wi-Fi access point configuration system is connected with the Wi-Fi access point to configure the Wi-Fi access point according to the information received from the at least one of the one or more cellular networks.

5 Claims, 3 Drawing Sheets

200

(56) References Cited

U.S. PATENT DOCUMENTS

| | | | |
|---|---|---|---|
| 2010/0296816 A1 | 11/2010 | Larsen | |
| 2012/0317224 A1 | 12/2012 | Caldwell et al. | |
| 2014/0307708 A1 | 10/2014 | Son et al. | |
| 2015/0311987 A1 | 10/2015 | Meyer | |
| 2016/0294500 A1 | 10/2016 | Chawgo et al. | |
| 2016/0345282 A1 | 11/2016 | Maca et al. | |
| 2017/0013513 A1 | 1/2017 | Agarwal et al. | |
| 2017/0295103 A1 | 10/2017 | Starsinic et al. | |
| 2018/0049033 A1 | 2/2018 | Clemenson et al. | |
| 2019/0044950 A1 | 2/2019 | Chen et al. | |
| 2019/0320498 A1 | 10/2019 | Sadri et al. | |
| 2020/0274756 A1* | 8/2020 | Gan | H04W 88/08 |
| 2020/0359380 A1 | 11/2020 | Chen et al. | |
| 2021/0037447 A1 | 2/2021 | Tarighat Mehrabani | |
| 2021/0153034 A1 | 5/2021 | Rosenschild et al. | |
| 2022/0322132 A1 | 10/2022 | Kim | |

OTHER PUBLICATIONS

European Patent Office; Extended European Search Report dated May 24, 2024; EPO Application No. 21809275.7; pp. 1-20 (2024).

\* cited by examiner

100

SYSTEM FOR CONFIGURING WI-FI ACCESS POINTS

CROSS-REFERENCE TO RELATED APPLICATIONS

The present application claims the benefit of U.S. Provisional Application No. 63/026,568, filed May 18, 2020, and entitled "SYSTEM FOR CONFIGURING WI-FI ACCESS POINTS", the entire contents of which are incorporated herein by reference.

BACKGROUND

In-building wireless communication coverage and access is an essential requirement of modern life. Various wireless communication standards may be used to provide such access. Today, cellular standards such as LTE or 5G, and wireless networking technology standards such as Wi-Fi (based on the IEEE 802.11 family of standards) are most commonly used. In time, it is anticipated that more and more consumers will switch seamlessly between the two types of standards. Various standards to allow such seamless switching have been defined. These include the $3^{rd}$ Generation Partnership Project (3GPP) standards for mobile communication, as well as new Wi-Fi standards such as Hotspot 2.0, which governs public access to Wi-Fi to improve bandwidth and services-on-demand for cellular-like roaming by users.

For larger buildings, wireless coverage may often be improved with systems such as repeaters or Distributed Antenna Systems (DAS). A DAS is a system of managed hubs and antennas, either local or remote, that distributes a wireless signal to a series of connected indoor or outdoor multi-band, multi-technology radios. A DAS head-end can include one or more base stations to provide the cellular or other wireless signal to the rest of the DAS. A main hub receives signals from the head-end, digitizes them, and distributes the signals to other hubs and radios via a high-bandwidth network, such as a fiber optic network. Such coverage enhancement systems may include features to enhance the signal conditions for various wireless signals such as LTE, 5G and Wi-Fi.

One way to facilitate the provision of Wi-Fi signals using a DAS system is to allow the DAS system to carry internet protocol (IP) traffic over the DAS system to Wi-Fi access points connected the DAS system. Each access point is a piece of networking hardware that allow connection to a wired network, usually through a router or other device One problem with such a system is the configuration of the Wi-Fi access points. Typically, these access points need to be configured through a network management system to ensure they have the correct setup. Such a configuration is typically manually launched by an installer who may require specialized knowledgeable about the associated wireless network. This creates installation inefficiencies and is prone to errors. Accordingly, what is needed is a system, and a method of using the same, for configuring Wi-Fi access points.

SUMMARY

This document describes a system, and method of using the same, for solving the above-described problem of configuring Wi-Fi access points in a wireless communication network. In one aspect, a Wi-Fi access point configuration system is connected to the cellular network and gathers information from the cellular network that will aid in the configuration of the Wi-Fi access point.

In one aspect, a system is provided to configure a Wi-Fi access point based on information received in explicit form from a cellular network.

In another aspect, a system is provided to configure a Wi-Fi access point based on information received in implicit form from a cellular network.

In yet another aspect, a method is provided to derive the configuration of a Wi-Fi access point from either explicit information or implicit information, or a combination thereof, received from a cellular network.

In still yet another aspect, a distributed antenna system is described that includes the ability to configure Wi-Fi access points connected to the distributed antenna system.

In accordance with the description herein, a system for configuring a Wi-Fi access point for communication with the Internet includes a Wi-Fi access point configuration system connected with one or more cellular networks and being configured to receive information from at least one of the one or more cellular networks. The Wi-Fi access point configuration system further is connected with the Wi-Fi access point to configure the Wi-Fi access point according to the information received from the at least one of the one or more cellular networks.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
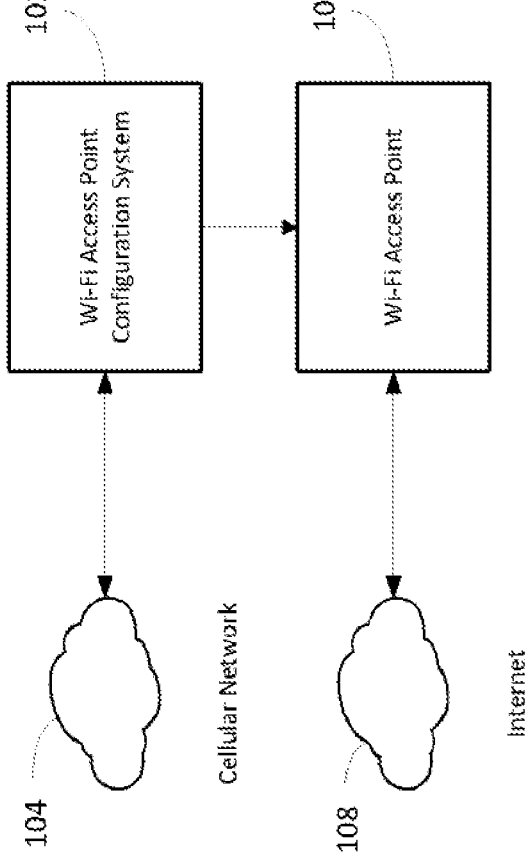
FIG. 1 illustrates a Wi-Fi access point configuration system.

This document describes a system and method for configuring Wi-Fi access points in a wireless communication network for access to the Internet 108. In accordance with some implementations, and as shown in FIG. 1, a system 100 includes a Wi-Fi access point configuration system 102 that is connected to a cellular network 104. The Wi-Fi access point configuration system 102 gathers information from the cellular network 104 that will aid in the configuration of a Wi-Fi access point 106. This information could be explicit or implicit. An example of explicit information is a message or messages containing configuration information for the Wi-Fi access point 106. An example of implicit information is receiving the identity of the cellular network and deciding on a configuration for the Wi-Fi access point based on this network identity.

In some implementations, the Wi-Fi access point 106 includes digital electronic circuitry and antennas for wireless digital communication with the Internet 108. The Wi-Fi access point configuration system 102 includes a processor and a non-transient machine-readable medium storing instructions that, when executed by the processor, cause the processor to perform automated, i.e., without human intervention (such as an installer, for instance), steps to configure the Wi-Fi access point (or other Wi-Fi access points, depending on the network).

Figure 2:
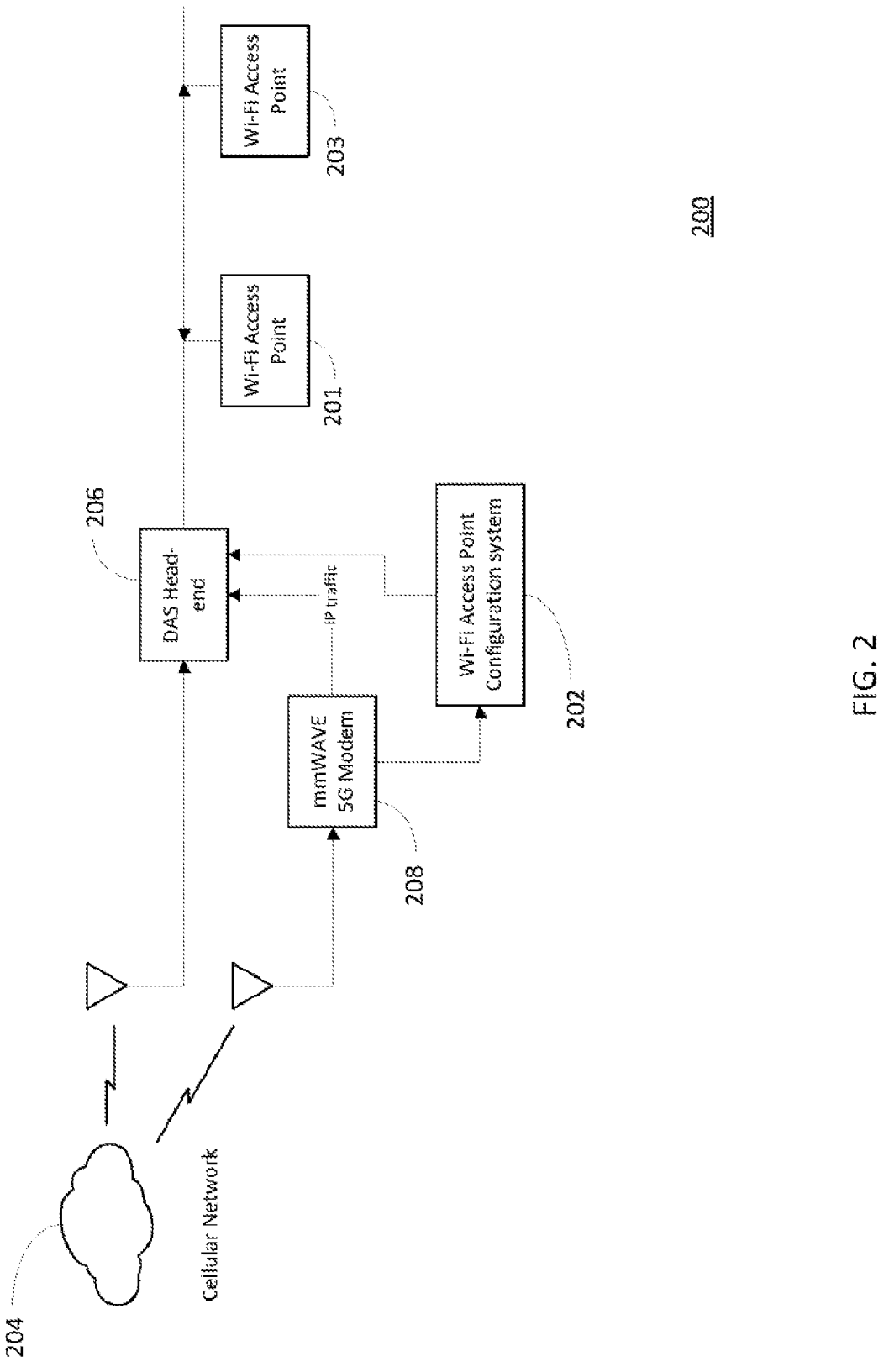
FIG. 2 illustrates a Wi-Fi access point configuration system as applied to a distributed antenna system.

In accordance with some implementations, and as shown in FIG. 2, a system and method for configuring Wi-Fi access points 201, 203, etc., in a wireless communication network can be applied to a distributed antenna system (DAS) 200. In some examples, a Wi-Fi access point configuration system 202 can be located inside the DAS head-end 206, inside a 5G mmWAVE modem 208, be a standalone system or could have many other embodiments and/or configurations. In this system the DAS system 200 receives cellular signals from a cellular network 204. These could be off-air or from a signal source such as a small cell. These signals can be distributed in a building on or according to the DAS infrastructure.

In some implementations, the system includes the high speed 5G mmWAVE modem 208 that is connected to the cellular network 204 via a wireless antenna. The output of the cellular 5G mmWAVE modem 208 is an IP data stream that is sent to the DAS head-end 206 where it is combined with other signals to be distributed on the DAS system 200 infrastructure. The Wi-Fi access point configuration system 202 extracts information from the mmWAVE 5G modem 208. Note this information could be extracted independently from an off-air signal or be sent to the configuration system by a remote server. In this example, the extracted information can be considered to be the PLMN-Id of the cellular network. The Wi-Fi Access point configuration system 202 then uses the PLMN-Id information to identify the cellular network 204 and to find a Wi-Fi Access Point configuration that matches the cellular network 204.

The above-described configurations can be a Hotspot 2.0 configuration. The configuration is then used to either directly configure the Wi-Fi access points 201, 203 connected to the DAS system or to configure them through some intermediary (such as the DAS head-end 206). Users with phones registered with the network operator can now use their phones or other mobile computing/communication devices to access the operator's network using either cellular signals or Wi-Fi signals, as the Wi-Fi access points are configured to support such roaming. Significantly, no configuration by an installer is required or necessary.

Figure 3:
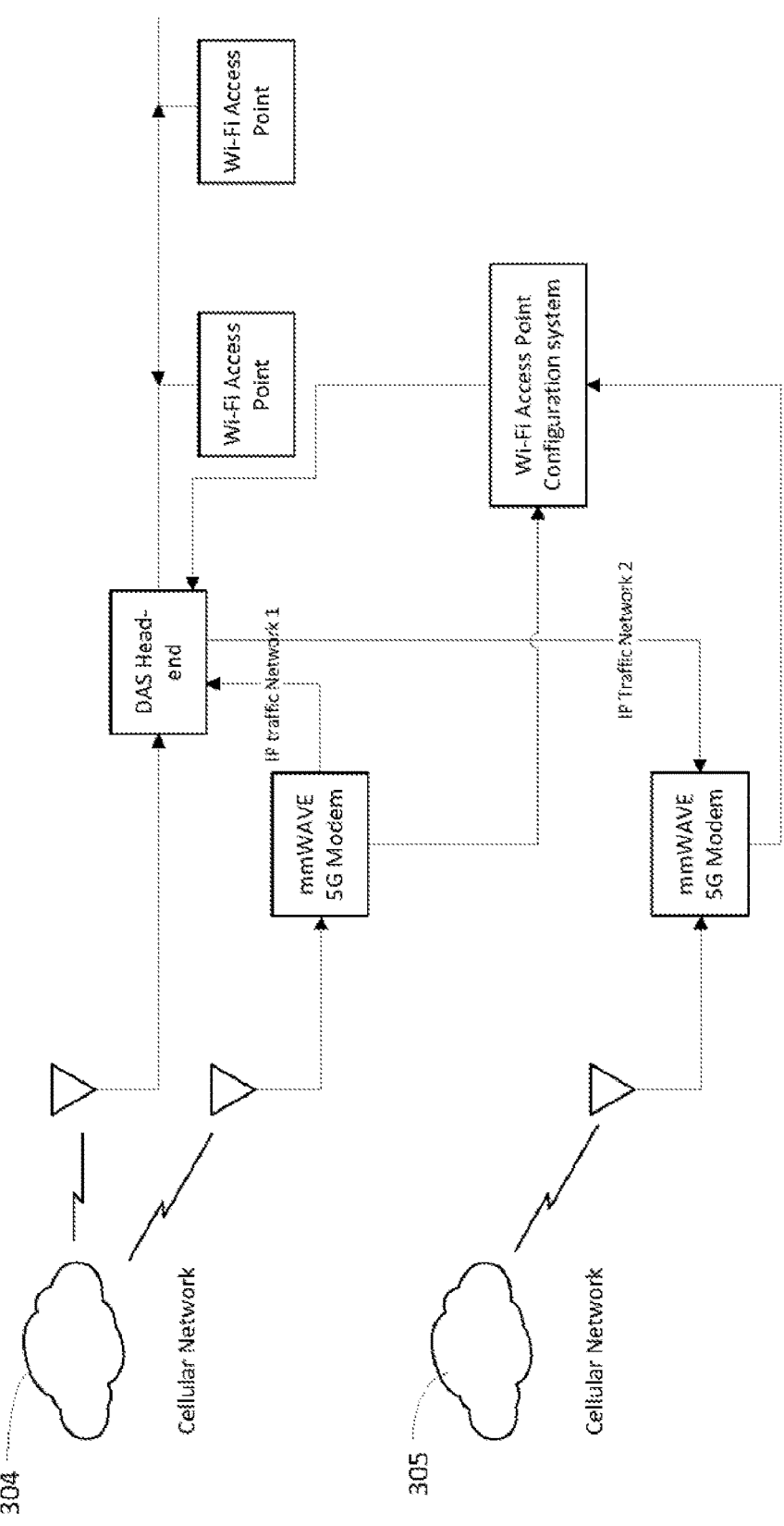
FIG. 3 illustrates a Wi-Fi access point configuration system that supports multiple networks including multiple distributed antenna systems.

It should be noted that it is also possible to have a single access point carry multiple network configurations to allow a single Wi-Fi access point to support users from different cellular networks 304, 305. This is shown in FIG. 3. In this case, the Wi-Fi access point configuration system could receive information from multiple cellular networks and devices, and multiple configurations or a single compound configuration for an access point to support multiple networks, which can rely on the same or different communication protocols and/or standards.

Although a few embodiments have been described in detail above, other modifications are possible. Other embodiments may be within the scope of the following claims.

The invention claimed is:

1. A system for configuring a Wi-Fi access point for communication with the Internet, the system comprising:
   a distributed antenna system (DAS) head-end; and
      a Wi-Fi access point configuration system connected with one or more cellular networks and being configured to receive information from at least one of the one or more cellular networks, the Wi-Fi access point configuration system further being connected with the Wi-Fi access point to configure the Wi-Fi access point according to the information received from the at least one of the one or more cellular networks, the Wi-Fi access point configuration system having a plurality of antennas for communicating with the distributed antenna system (DAS) head-end, and wherein the Wi-Fi access point configuration system is switchably connected, based on information received from at least two of the one or more cellular networks by the DAS head-end with each of the two of the one or more cellular networks via the distributed antenna system (DAS) head-end.

2. The system in accordance with claim 1, wherein the information received from the one or more cellular networks includes explicit information that contains configuration data for the Wi-Fi access point configuration system.

3. The system in accordance with claim 1, wherein the information received from the one or more cellular networks includes implicit information that contains identity data of the at least one of the one or more cellular networks, the identity data being used by the Wi-Fi access point configuration system for configuring the Wi-Fi access point.

4. The system in accordance with claim 1, wherein the information received from the one or more cellular networks includes configuration data for the Wi-Fi access point, and implicit information that contains identity data of the at least one of the one or more cellular networks, the identity data being used by the Wi-Fi access point configuration system for configuring the Wi-Fi access point.

5. The system in accordance with claim 1, wherein the Wi-Fi access point configuration system is integrated within or located inside the distributed antenna system (DAS) head-end that is connected with at least one of the one or more cellular networks via the one or more antennas.

* * * * *